(12) United States Patent
Nakagawa et al.

(10) Patent No.: US 7,868,991 B2
(45) Date of Patent: Jan. 11, 2011

(54) WIRING FIGURE PATTERN OF DISPLAY PANEL

(75) Inventors: Hidetoshi Nakagawa, Tsu (JP); Naoshi Yamada, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/630,017

(22) Filed: Dec. 3, 2009

(65) Prior Publication Data

US 2010/0079716 A1 Apr. 1, 2010

Related U.S. Application Data

(62) Division of application No. 11/722,796, filed as application No. PCT/JP2005/022912 on Dec. 14, 2005, now Pat. No. 7,649,607.

(30) Foreign Application Priority Data

Dec. 28, 2004 (JP) .............................. 2004-380091

(51) Int. Cl.
  *G02F 1/1339* (2006.01)
  *G02F 1/1345* (2006.01)
  *G02F 1/1343* (2006.01)
(52) U.S. Cl. ........................ 349/153; 349/149; 349/139; 349/154; 349/190
(58) Field of Classification Search ................. 349/153, 349/149, 139, 154, 190
  See application file for complete search history.

(56) References Cited

U.S. PATENT DOCUMENTS 6,424,394 B1 * 7/2002 Morii .......................... 349/110

7,199,855 B2 * 4/2007 Yoshimi et al. .............. 349/187
7,575,965 B2 * 8/2009 Kuwabara et al. ........... 438/151
7,586,561 B2 * 9/2009 Hanaoka ....................... 349/93

OTHER PUBLICATIONS

Nakagawa et al. "Wiring Figure Pattern of Display Panel", U.S. Appl. No. 11/722,796, filed Jun. 25, 2007.

* cited by examiner

*Primary Examiner*—Mike Qi
(74) *Attorney, Agent, or Firm*—Keating & Bennett, LLP

(57) ABSTRACT

In a wiring figure pattern of a display panel, each wiring is separated into bands of optimal widths by slits of a constant width as a wiring figure pattern so that minimum light irradiation for curing a photocuring sealing material can be carried out without increasing the electric resistance of the wiring. The optimal width means a resistance such that light coming from both sides of the band cures the sealing material on the upper surface of the band without influencing the driving and display of liquid crystal. At a point where the width of wiring becomes two times or more of the optical width between the start point and end point of intersection of the wiring and the sealing material region, the wiring is divided by the slit. A first branch forms the band of the optimal width extending from the branch point to the end point, whereas the second branch extends to the end point and is spaced apart from the first branch by the width of the slit. At a point where the width becomes two times or more of the optimal width, the wiring is divided. Subsequently, branching is repeated until the end point is reached. A continuous triangle is formed in the slit at each branch, thus adjusting the width of the bands to have the optimal width.

9 Claims, 11 Drawing Sheets

WIRING FIGURE PATTERN OF DISPLAY PANEL

BACKGROUND OF THE INVENTION

1. Field of the Invention

The present invention relates to a display panel using liquid crystal or the like as a display medium, and more particularly, the present invention relates to a wiring pattern of the display panel in which slits and openings are formed to permit passage of light for irradiation of a photo-setting sealing material, as encountered in a case where a photo-setting sealing material is used to bond together a pair of transparent substrates in the fabrication process of such a display panel.

2. Description of the Related Art

What is sought after in display panels is high picture quality and high resolution, in addition to frame narrowing.

Various attempts have been made to achieve frame narrowing. According to one such attempt, in a display panel in which a photo-setting sealing material (hereinafter also simply referred to as "sealing material") that hardens when irradiated with light such as ultraviolet rays is used to bond together a wiring substrate and a color filter substrate, attention is paid to the arrangement of the sealing material relative to a light-shielding film formed in the frame region on the color filter substrate.

Conventionally, after the bonding together of the two substrates, as seen in a plan view, the sealing material is arranged outside the light-shielding film. This is because the light-shielding film naturally shields light and therefore, placing the sealing material right below it makes irradiation of the sealing material with light impossible. Thus, the frame region needs to be at least as wide as, and hence not less wide than, the width of the light-shielding film plus the width of the region over which the sealing material is applied.

At this point, if openings are formed in the light-shielding film so that, when the two substrates are put together, those light passages are located right above the sealing material, then by shining light from directly above the light-shielding film, it is possible to harden the sealing material located directly below it. This method is disclosed in JP-A-2000-089235.

This method permits a photo-setting sealing material to be placed right below a light-shielding film, and thereby contributes to frame narrowing by the width of the sealing material region.

Such openings formed in a light-shielding film are typically given a parallel-wiring (lines and spaces) structure as shown in FIG. 4, or a mesh-like structure having a rectangular unit opening repeated vertically and horizontally as shown in FIGS. 5A and 5B.

In the first place, however, forming openings in a light-shielding film risks spoiling its essential function, namely the function of preventing unnecessary leakage of light from the frame region to the display region.

On the other hand, another method is known whereby, while a light-shielding film is left untouched, openings are formed in a wiring on the opposite substrate, namely the wiring substrate, so that a sealing material is hardened by being irradiated with light from behind the wiring substrate.

In this case, the size and shape of openings formed in a light-shielding film cannot be applied to openings formed in a wiring.

The reason is that, in a wiring, not to mention such wide openings having a parallel-wiring structure as would be formed in a light-shielding film as described above, even narrow openings such as slits produce electrical resistance. In a case where slits are formed in a wiring, from the perspective of minimizing electrical resistance, any portion of the wiring located between adjacent slits needs to be made as wide as possible.

In contrast, from the perspective of maximizing the amount of light (light energy) with which a photo-setting sealing material is irradiated, any portion of the wiring located between adjacent slits needs to be made as narrow as possible. This is because making such a portion of the wiring too wide may prevent the light diffracted around from the adjoining slits from reaching the width center of that portion, leaving the sealing material there unhardened.

As described above, in a case where slits or openings are formed in a wiring for the purpose of hardening a photo-setting sealing material, their size and shape need to be worked out with consideration given to the tradeoff between electrical resistance and how light reaches the sealing material.

Incidentally, today, as one way to achieve cost reduction in display panels, boardless wirings are often adopted. Boardless wirings are wirings arranged outside the display region (i.e., in the frame region) of a display panel, as a replacement for a shared board (PWB, printed wiring board) that is inserted between a display panel (typically, a liquid crystal display panel) and a signal control board to connect the driver connected to the former to the latter. This method of wiring eliminates the need for the shared board, and thus contributes to cost reduction. An example of boardless wirings is disclosed in, for example, JP-A-2001-056481.

In a set of boardless wirings, a plurality of wirings having different functions are arranged together. These wirings have different widths from one another, and in addition, their widths vary along their lengths, each wiring thus having an irregular pattern. This is schematically shown in FIG. 6A. In the figure, a part between the upper and lower horizontal two dot chain lines is where a sealing material is laid, and one of a set of boardless wirings crosses that part.

Suppose that, in this one of the set of boardless wirings, the above mentioned parallel-wiring structure is applied, and the wiring is separated from the right side into equally wide bands with slits formed between them. Then, as indicated by hatching in the left part of FIG. 6B, an odd region is left. At this point, the width of each of the equally wide bands thus separated with slits formed between them is optimized such that, when being irradiated with light having a predetermined energy, the light diffracted around both sides of each band can completely harden the photo-setting sealing material located at the top of that band, and in addition, such that the electrical resistance of the bands is so low as not to affect the driving of and display with liquid crystal.

Seemingly, giving this odd region a wiring figure pattern as shown in FIG. 6C is likely to permit the sealing material to be irradiated with light sufficiently. Now the wiring figure pattern shown in FIG. 6C will be studied for a while.

The odd region in the left is patterned such that, as it extends from the start point to the end point of the region where it overlaps with the sealing material, its width branches into two with a slit between them near the location where the width becomes about twice or more than the optimal width mentioned above for the first time. Of the resulting two, the first forms a band that remains equal to the optimal width from the branch point to its end point; the second, while extending to its end point along the first with a slit between them, further branches into two near the location where the width becomes about twice or more the optimal width mentioned above for the first time. In the figure, this branching is repeated once more before reaching the end point.

In this way, the odd region is separated into bands having the optimal width to form as many slits as permissible, in an attempt to increase the efficiency of the hardening of the sealing material over the entire wiring. Even then, near the branch points (in FIG. 6C, the parts encircled in closed curves indicated with the reference numeral 30), the width of the band is still larger than the optimal width; thus, there, the sealing material may be left unhardened. This is overcome in preferred embodiments of the present invention that will be presented later, and how that is achieved will be explained in the descriptions of the individual preferred embodiments that will be provided later.

Next, a description will be given of a case where mesh-like structure as shown in FIG. 5A or 5B is formed in a wiring. In FIG. 5A is shown an example of a pattern in which a mesh-like structure is formed with square unit openings 20 and the distance between adjacent openings 20 is equal to the length L of each side of the square. In this case, the distance L between adjacent openings, that is, the width L of each wiring portion separated by the openings 20, is optimized, as described above, such that the electrical resistance of the wiring portions is so low as not to affect the driving of and display with liquid crystal, and in addition that the light diffracted around both ends of the width can completely overlap at the center of the width to permit the sealing material right above it to harden completely.

In FIG. 5B is shown an example of a mesh-like structure that is formed with rectangular unit openings 21 measuring S along their shorter sides and L along their longer sides (S<L), with the unit openings 21 arrayed at a distance equal to the length L of their longer sides from one another both vertically and horizontally.

In this case also, the width of each wiring portion separated by the openings 21, that is, the length L of the longer sides of the openings 21, is optimized such that the electrical resistance of the wiring portions is so low as not to affect the driving of and display with liquid crystal, and in addition that the light diffracted around both ends of the width can completely overlap at the center of the width to permit the sealing material right above it to harden completely. Inconveniently, however, such mesh-like structures have the following disadvantages irrespective of whether or not they are applied to a boardless wiring.

In the above described mesh-like structure having square unit openings, the distance between diagonally adjacent squares, as measured between their mutually nearest vertices along the diagonal line, is $\sqrt{2}L$. Thus, the light diffracted around both ends of this distance does not overlap at the center of the $\sqrt{2}L$ long line. Accordingly, the sealing material is left unhardened around the center of that line.

The same occurs with the rectangular openings 21 shown in FIG. 5B. In this case also, the distance between the mutually nearest vertices of diagonally adjacent openings 21 is $\sqrt{2}L$. Thus, as with the square openings 20, the sealing material may be left unhardened around the center of the $\sqrt{2}L$ long line.

If there are many such unhardened parts scattered over the sealing material, they weaken the bond between substrates, and may even make it impossible to bond them at all in the worst case.

Moreover, if such unhardened parts of the sealing material are located at the boundary with a liquid crystal layer, the unhardened sealing material may flow into the liquid crystal layer, adversely affecting the display performance of the panel.

SUMMARY OF THE INVENTION

In order to overcome the problems described above, preferred embodiments of the present invention provide a wiring figure pattern of display panes that permits a photo-setting sealing material to be irradiated with the minimum amount of light necessary to harden it without causing an increase in the electrical resistance in a case where, in a wiring pattern formed on a glass substrate of a display panel, a parallel-wiring structure or a mesh-like structure is adopted to permit passage of light with which to irradiate the photo-setting sealing material.

According to a preferred embodiment of the present invention, a wiring figure pattern of a display panel includes a display medium held between a pair of transparent substrates on at least one of which the wiring is formed, in which the wiring has a slit formed therein in a region where the wiring overlaps with the photo-setting sealing material so that the photo-setting sealing material is irradiated with light through the slit to permit the pair of transparent substrates to be bonded together with a photo-setting sealing material, wherein the slit causes the wiring to branch into at least one first band extending along a wiring direction and at least one second band including at least one of a branch point and a merge point and extending along the wiring direction, and in order to provide all the bands with an optimal width such that, upon irradiation with light having a predetermined energy, light diffracted around from both sides of the bands to top surfaces thereof hardens the photo-setting sealing material located on the top surfaces of the bands, and such that the bands have a predetermined electrical resistance that does not affect driving of and display with liquid crystal, at the branch point and the merge point included in the second band, wherever a band width is larger than the optimal width, the band width is adjusted by varying a width of an end portion of the slit located there.

With this pattern, it is possible, while avoiding an increase in wiring resistance, to permit the light diffracted around from the slits adjoining both sides of a band to reach the center of the top surface of the band so that the entire wiring is irradiated with light.

In a case where openings are formed in a mesh-like structure, the openings preferably are unit figure openings having a rectangular or substantially rectangular shape and having a cut portion at least at one of four corners thereof which are arrayed both horizontally and vertically at a distance from one another that is substantially equal to a long-side length of the rectangular or substantially rectangular shape to form a mesh-like structure, and the long-side length is substantially equal to an optimal width such that, on irradiation with light having a predetermined energy, light diffracted around from horizontally and vertically adjoining openings hardens the photo-setting sealing material located on the wiring between those openings and in addition that portions of the wiring having the width substantially equal to the long-side length have a predetermined electrical resistance that does not affect driving of and display with liquid crystal.

With this pattern, the shortest distance between the edges of the cut portions of diagonally adjacent openings having cut portions is substantially equal to or less than the distance between openings adjacent in the direction (horizontal) of the width of the wiring. Thus, the light radiated from behind the wiring substrate reaches the center between diagonally adjacent openings so that the entire wiring is irradiated with light.

Devised as described above, preferred embodiments of the present invention permit a photo-setting sealing material to be irradiated with the minimum amount of light that makes it harden, through slits or openings formed in a wiring on a wiring substrate but nevertheless without increase in the electrical resistance of the wiring.

This makes it possible to bond opposite glass substrates together securely in the fabrication of a display panel.

Other features, elements, steps, characteristics and advantages of the present invention will become more apparent from the following detailed description of preferred embodiments of the present invention with reference to the attached drawings.

BRIEF DESCRIPTION OF DRAWINGS

FIG. 3A, 3B are diagrams to show wiring figure patterns of display panel, wherein FIG. 3A shows a conventional wiring figure pattern of display panel and FIG. 3B shows a wiring figure pattern of display panel according to a third preferred embodiment of the present invention.

FIG. 6B and FIG. 6C illustrate the shortcoming experienced with a conventional parallel-wiring structure applied to a boardless wiring.

DETAILED DESCRIPTION OF PREFERRED EMBODIMENTS

Hereinafter, preferred embodiments of the present invention will be described.

As mentioned previously, the present invention relates to the wiring figure pattern of a display panel formed on a transparent substrate (for example, a glass substrate) in a wiring substrate (for example, an active matrix substrate), and because forming the wiring is achieved by a well-known, widely-practiced method, as by forming a metal film (such as a Ti/Al/Ti multilayer film) on a transparent substrate by sputtering and then forming a resist pattern by photolithography), therefore no further description will be given of the method itself for forming a wiring.

First Preferred Embodiment

Figure 1:
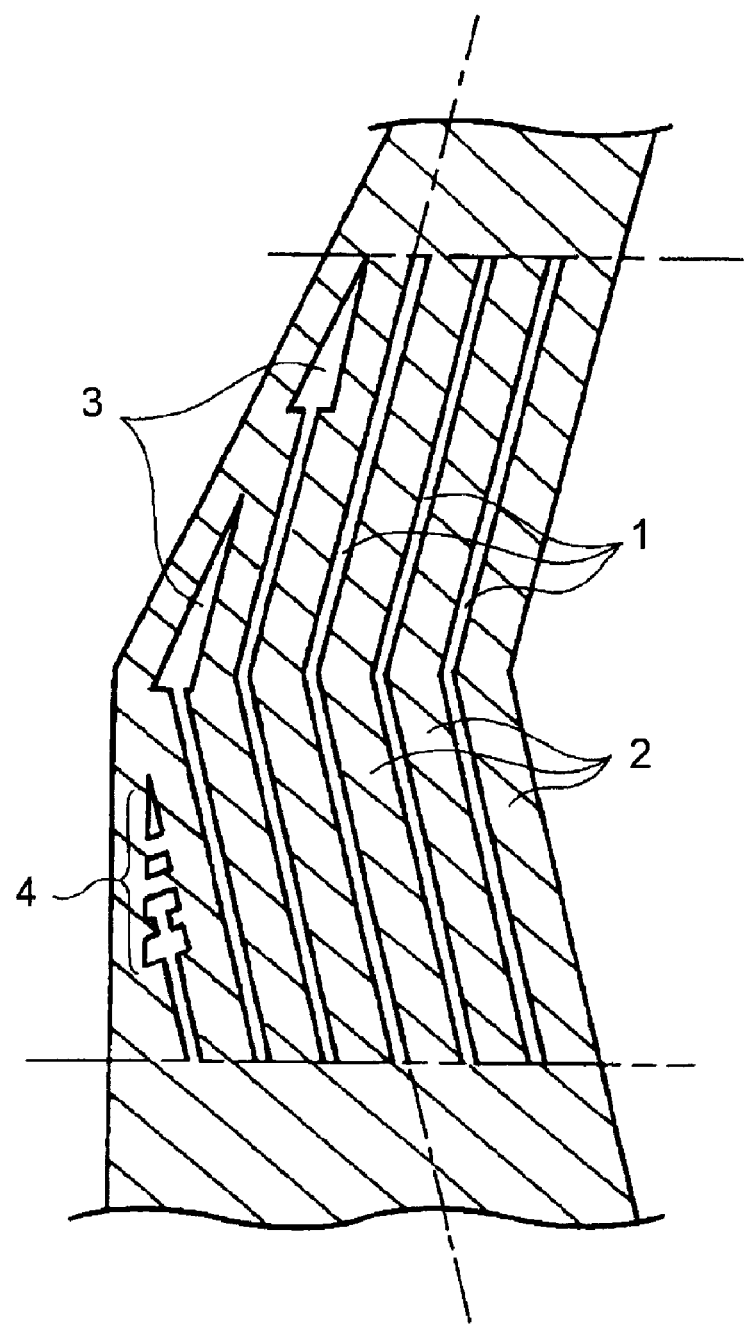
FIG. 1 is a diagram to show a wiring figure pattern of display panel according to a first preferred embodiment of the present invention.

FIG. 1 shows a wiring figure pattern of display panel according to a first preferred embodiment. In the wiring figure pattern of this preferred embodiment, a parallel-wiring structure is adopted. This preferred embodiment is preferably applied to a boardless wiring, for example.

The irregular pattern shown in the figure, as a whole, represents one of a set of boardless wirings. In the figure, the part between the upper and lower horizontal two dot chain lines is the region where a sealing material is applied. In this region where the sealing material is applied, in the part where the wiring overlaps with the sealing material, slits 1 forming a parallel-wiring structure are formed.

Now the left and right parts of this boardless wiring as divided along the single dot chain line shown in the figure will be described separately. In the region shown in the right part of the figure, three substantially equally wide bands 2 separated by substantially equally wide slits 1 extend along the contour of the right edge of the boardless wiring from the start point to the end point of the region where the boardless wiring overlaps with the sealing material. These bands 2 have an optimized width as described previously, that is, a width that is as minimal as possible so long as the electrical resistance of the bands 2 does not effect the driving of and display with liquid crystal and that is simultaneously as maximal as possible so long as the light diffracted around from the slits 1 adjoining the bands 2 (wiring portions) toward the surface of the bands 2 reaches the center of their width so that the entire sealing material is irradiated with light.

Figure 6C:
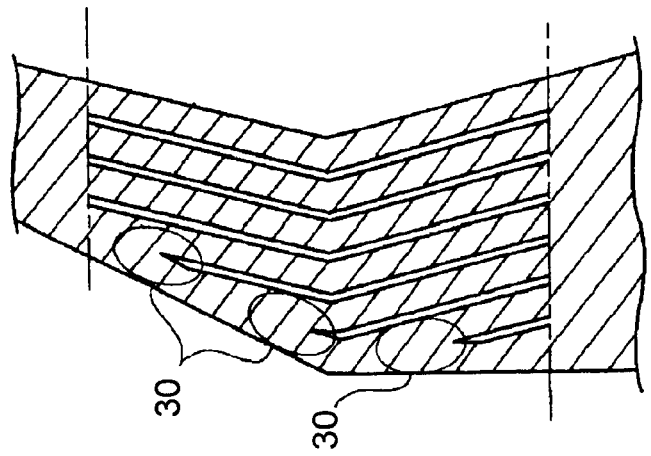
FIG. 6A, 6B, 6C are diagrams to illustrate the conventional wiring figure pattern, wherein FIG. 6A schematically shows part of one of a set of boardless wirings.
Figure 6B:
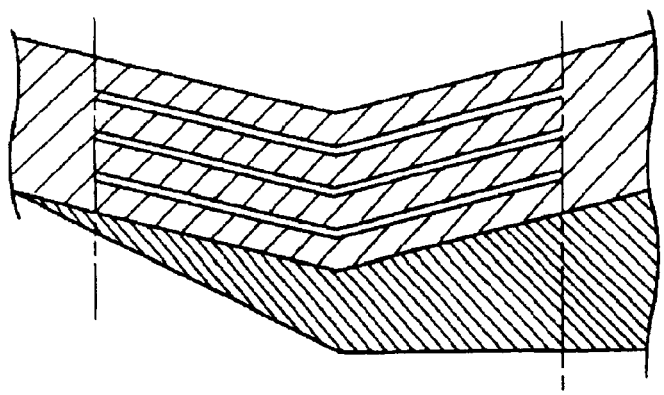
Figure 6A:
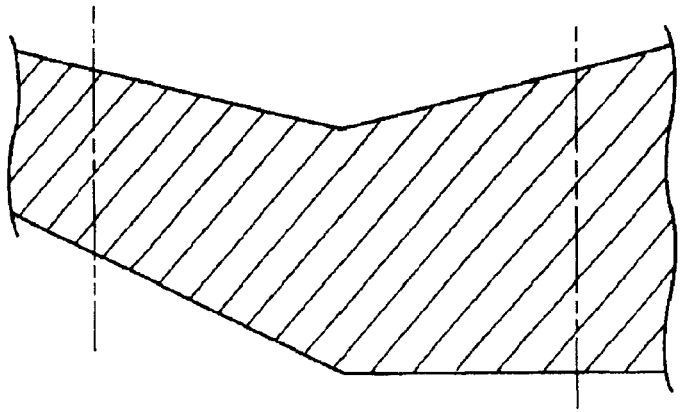

On the other hand, in the left region, the width at the start point and end point of the region where the boardless wiring overlaps with the sealing material is larger than the above described optimal width, and thus this region is the part having an odd outline shape (see FIG. 6B described previously) that is left when a simple parallel-wiring structure is applied to a boardless wiring having a complicated outline shape (see FIG. 6A described previously).

In this preferred embodiment, this part having an odd outline shape is further processed such that it permits the sealing material on the surface of the wiring to be irradiated with sufficient light without increase in the electrical resistance of the wiring. As described previously in connection with the conventional example, in the course toward that end, modifying the pattern shown in FIG. 6B to that shown in FIG. 6C still leaves unsatisfactory parts in the pattern shown in FIG. 6C.

Specifically, in FIG. 6C, irradiation with light may be insufficient near the branch points (parts encircled in closed curves) between bands. To overcome this, in this preferred embodiment, as shown in FIG. 1, the shape at the end of a slit near each such branch point is modified so as to be added triangular or substantially triangular shaped portion.

This triangular or substantially triangular shape portion is a cut portion 3 having an inner angle which is the same as branch angle of each branch point. Giving the end of a slit located at a branch portion a triangular or substantially triangular shape like this makes it possible for the branch to keep a width close to the above mentioned optimal width until it reaches the next branch point.

In this way, it is possible to obtain a wiring figure pattern of a display panel that permits sufficient irradiation with light without increase in electrical resistance not only in band wiring portions that keep an optimal width all over their length, but also in the other wiring portions.

In terms of the shape, those at the end of a slit near a branch portion may be any other than that of the triangular or substantially triangular cut portion 3 described specifically above.

Even the triangular or substantially triangular cut portion 3 may further be subdivided as indicated by the reference numeral 4. This leads to lower electrical resistance.

Figure 7:
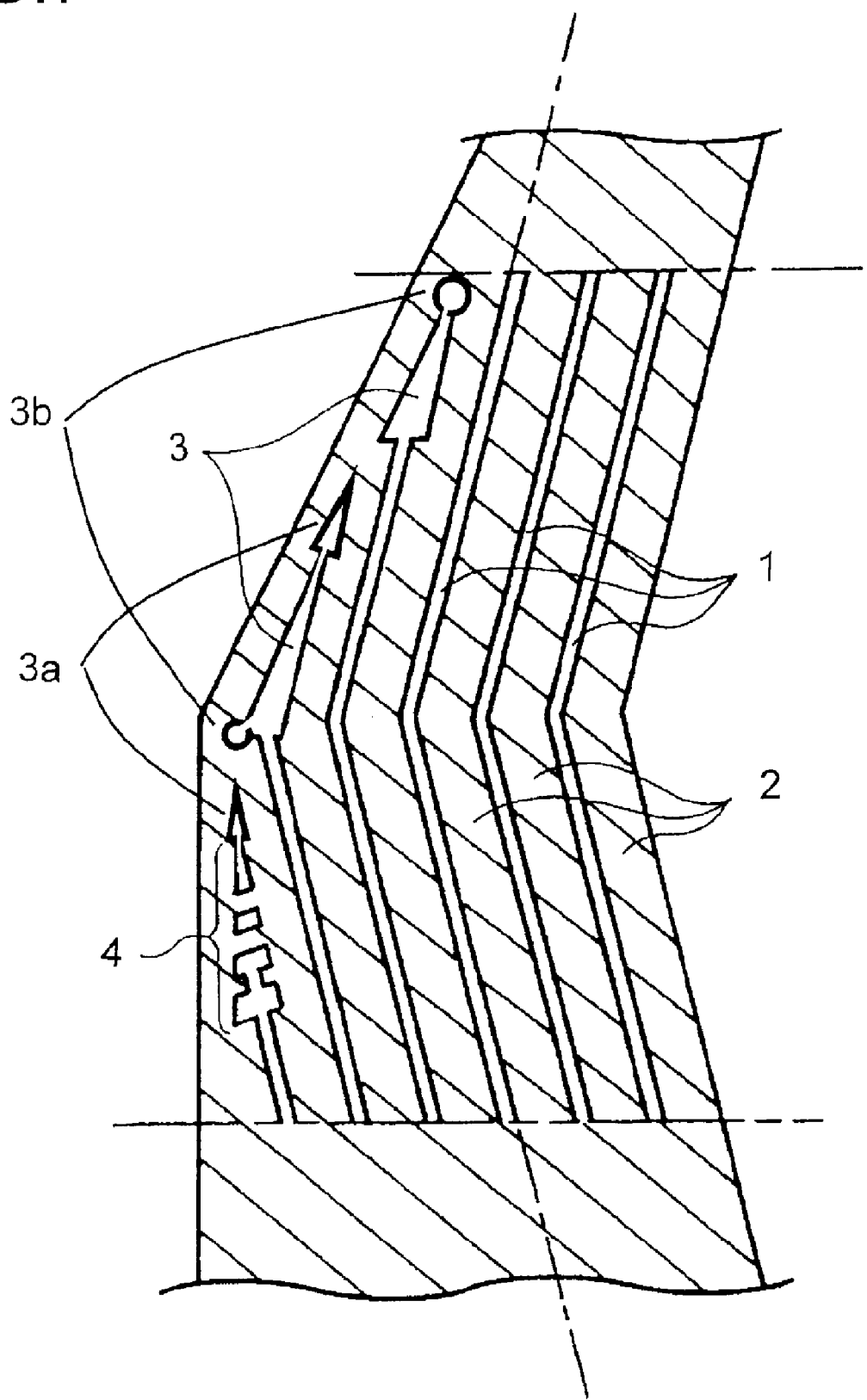
FIG. 7 shows a modified example of the first preferred embodiment of the present invention.

Now a further modified example of the first preferred embodiment will be described with reference to FIG. 7. As shown in FIG. 7, wherever the wiring portion width is large, triangular or substantially triangular openings 3a, circular or substantially circular cuts 3b, and the like may additionally be formed. The shape of the circular or substantially circular cuts 3b does not need to be perfectly circular, but may be any close to circular, such as polygonal and elliptic. Put more generally, the present invention aims at making as even as possible the distances from the edges of openings in a wiring pattern of display panel while minimizing an increase in electrical resistance in a pattern like the one shown in FIG. 6A, and therefore, within this spirit, any shape may be adopted.

Needless to say, this modified example covers wiring figure patterns such as those involving a pattern having rounded corners, and those involving a curve composed of a plurality of straight lines connected together.

Second Preferred Embodiment

Figure 2A:
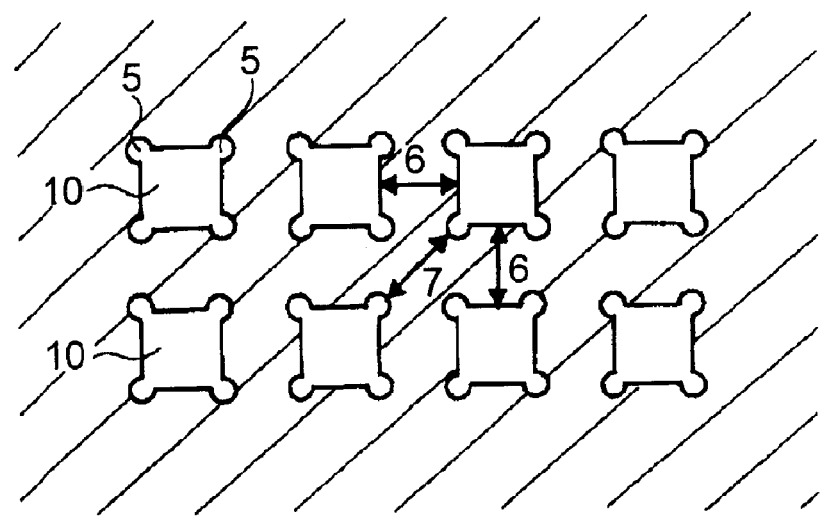
FIG. 2A, 2B show examples of mesh-like structures according to a second preferred embodiment of the present invention, wherein in FIG. 2A substantially square unit figure openings are shown and in FIG. 2B substantially rectangular unit figure openings are shown.
Figure 2B:
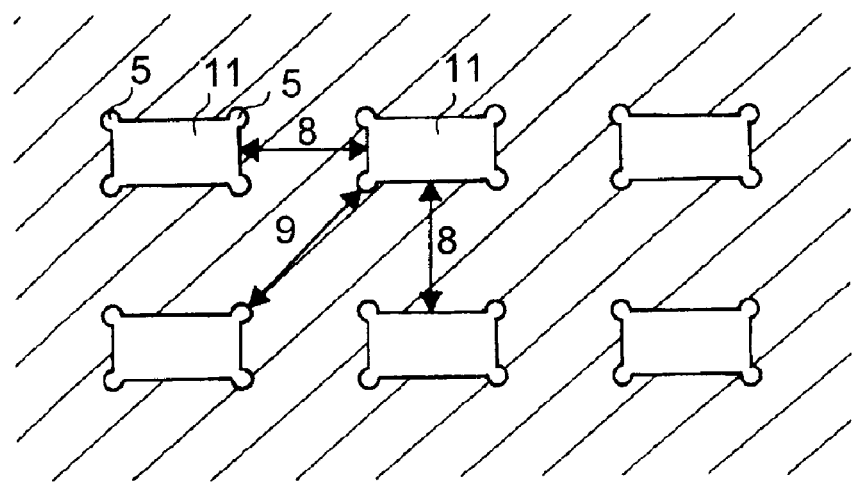
Figure 5A:
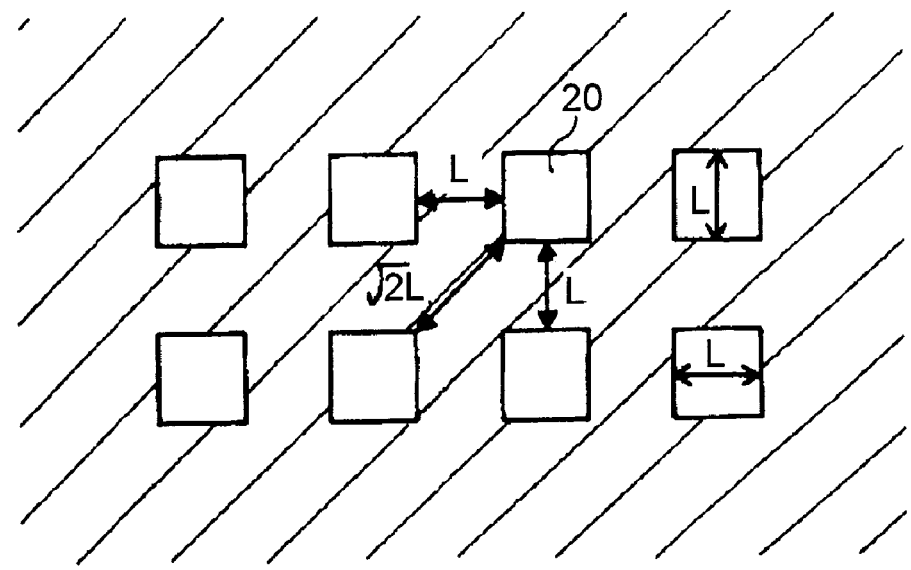
FIG. 5A, 5B are diagrams to illustrate the shortcoming experienced with conventional mesh-like structures.
Figure 5B:
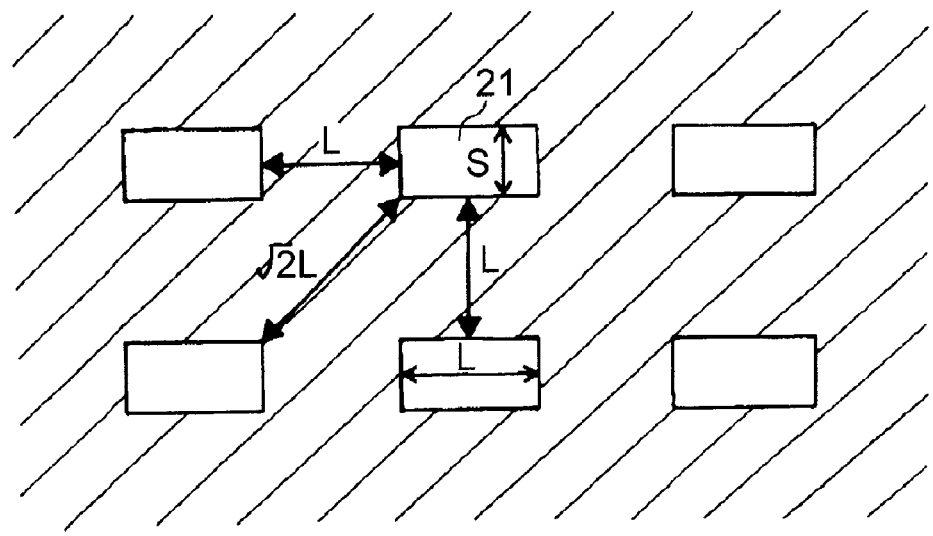

FIG. 2A, 2B show wiring figure patterns for the boardless wiring according to a second preferred embodiment of the present invention. These wiring figure patterns have mesh-like structures. In FIG. 5A is shown a mesh-like structure having square unit figure openings 10, and in FIG. 5B is shown a mesh-like structure having rectangular unit figure openings 11. These correspond to the conventional examples described previously and shown in FIGS. 5A and 5B, and incorporate improvements over them.

As shown in FIG. 2A, in the wiring figure pattern shown at 2A, the distance between the square or substantially square unit figure openings 10, that is, the wiring portion width 6, is optimized so as to be minimal so long as the electrical resistance there does not affect the driving of and display with liquid crystal and simultaneously to be maximal so long as the light diffracted around from the square openings 10 adjoining the wiring portions overlap so that the entire sealing material is irradiated with light even in its parts located right above the wiring portion width.

In the conventional example, because of the simple square shape, the wiring portion located between diagonally adjacent openings as measured along the diagonal line is $\sqrt{2}$ times the optimal width mentioned above, and in this direction the light diffracted around from the adjoining openings does not reach the center between those openings, leaving an unhardened part in the sealing material as described previously.

To cope with this, according to the present preferred embodiment of the present invention, at the four corners of the square or substantially square openings 10, cut portions 5 are formed. In this preferred embodiment, the cut portions 5 preferably have a shape as shown in the figure.

As a result, with respect to diagonally adjacent openings 10, the distance 7 between the intersections of their nearest cut portions 5 with the diagonal line is substantially equal to the optimal wiring width 6, and thus the light diffracted around from the openings 10 overlaps on the diagonal line. This permits the sealing material there to be irradiated with sufficient light, and thereby prevents the sealing material from being left partly unhardened.

The same applies to the rectangular or substantially rectangular openings 11 measuring S along their shorter sides and L along their longer sides (S<L) shown in FIG. 2B. Of this pattern, an illustration alone is given, and no further explanation will be given. In this case, the distance indicated by the reference numerals 8 and 9 in the figure are equal.

Although, in the second preferred embodiment, cut portions 5 shaped as shown in the figure are formed at the four corners of a perpendicular or substantially perpendicular quadrilateral (square or rectangular, or substantially square or substantially rectangular) openings, the shape of the cut portions 5 is not limited to the one specifically shown in the figure but may be any other so long as the shortest distance between the cut portions substantially equals the optimal width mentioned above. Forming openings having a mesh-like structure like this is effective with common transfer wirings.

Next, other modified examples of the second preferred embodiment will be described with reference to FIGS. 8 to 11. Since various preferred embodiments of the present invention aim at making as even as possible the distances from the edges of openings in a wiring pattern to the center of wiring portions, the pattern of unit openings does not necessarily have to be like those shown in FIG. 3B based on the square openings shown in FIG. 2A.

FIGS. 8A, 8B to FIG. 11A, 11B, 11C show examples in which, as compared with a simple rectangular shape, the distances from the edges of openings in a wiring pattern to the center of wiring portions are closer together between the singly-extending parts and intersecting parts of the wiring portions. In other words, in these examples, deviations from a predetermined optimal width with respect to the use of light are more even than with a simple rectangular shape as shown in FIG. 5A, 5B.

Figure 8A:
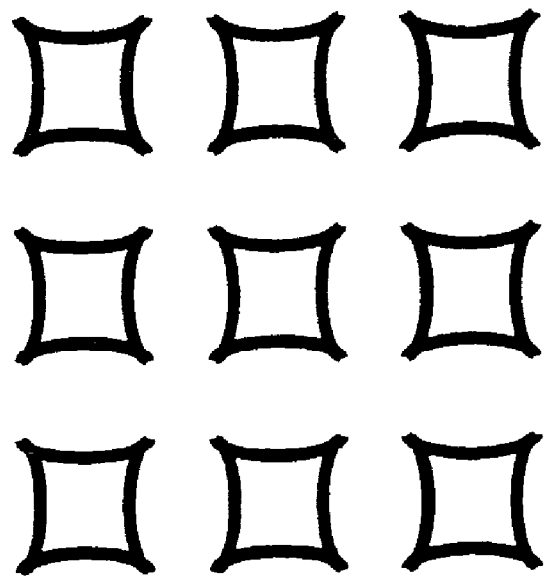
FIG. 8A, 8B show different modified examples of the second preferred embodiment of the present invention.
Figure 8B:
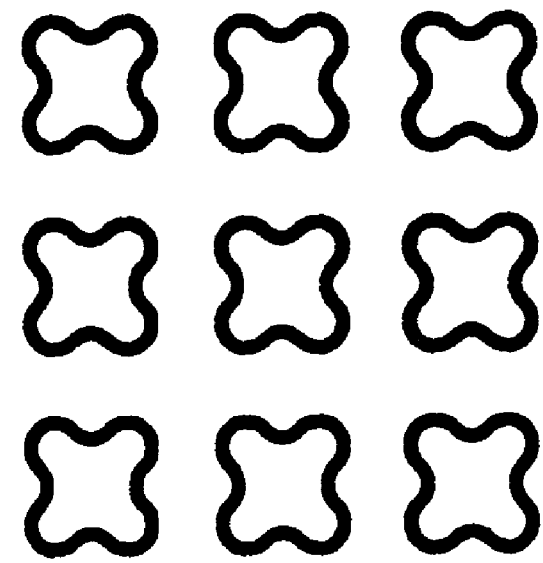

For example, instead of the rectangular shape shown in FIG. 5A, 5B, a star-like shape as shown in FIG. 8A or a four-lobed shape as shown in FIG. 8B may be adopted.

Figure 9:
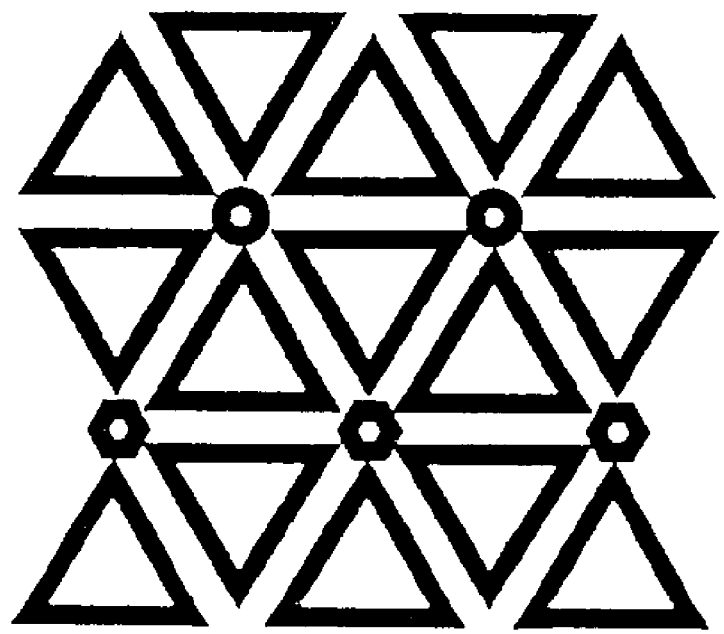
FIG. 9 shows a modified example of the second preferred embodiment of the present invention.

As shown in FIG. 9, triangular or substantially triangular openings may be combined with circular or substantially circular cuts 12a or hexagonal or substantially hexagonal cuts 12b formed in the intersecting parts of wiring portions and thus, the wiring width is large. In FIG. 9, to avoid presenting two very similar drawings, circular or substantially circular cuts 12a and hexagonal or substantially hexagonal cuts 12b are shown together. It should be noted that cuts of either type may be formed alone. Since this is an application of the cuts 4 in the first preferred embodiment shown in FIG. 1 to a mesh-like pattern, it is also possible to form openings at the center of the intersecting parts of wiring portions in the simple rectangular patterns shown in FIGS. 5A and B. When formed at the center of the intersecting parts of wiring portions in the rectangular pattern shown in FIG. 5A, a rhombic shape or cross-like shape is suitable, but any other pattern may be adopted.

Figure 10A:
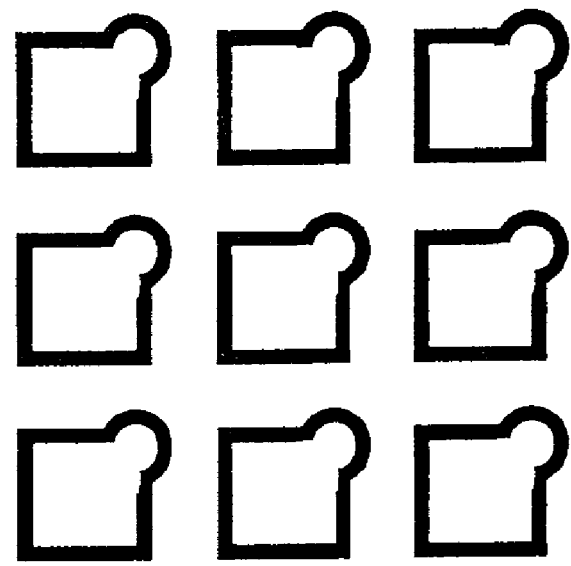
FIG. 10A, 10B show different modified examples of the second preferred embodiment of the present invention.
Figure 10B:
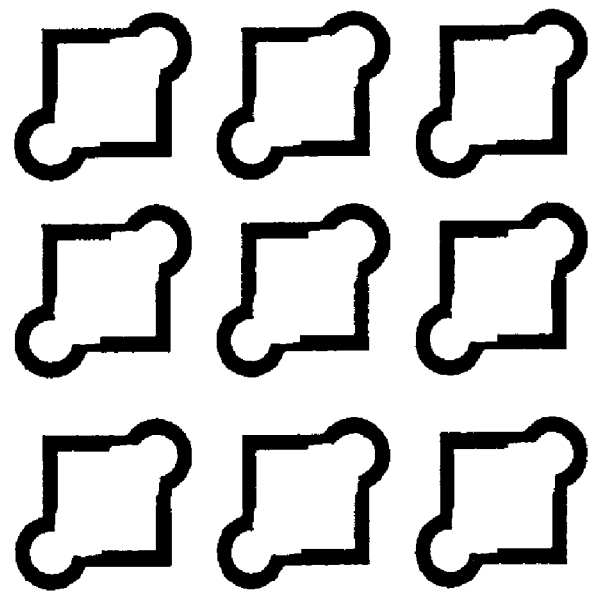
Figure 11A:
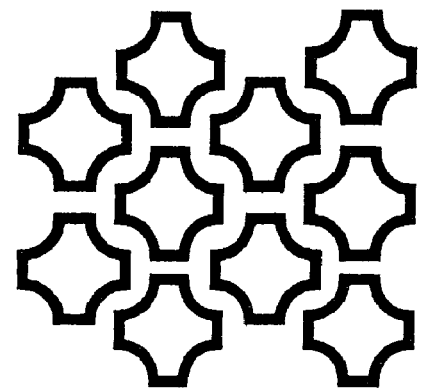
FIG. 11A, 11B, 11C show different modified examples of the second preferred embodiment of the present invention.
Figure 11B:
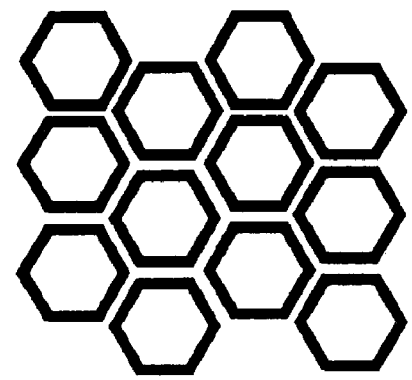
Figure 11C:
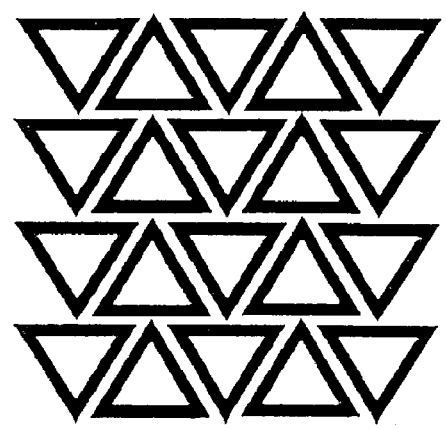

Other than the patterns shown in FIGS. 8A, 8B and FIG. 9, it is also possible to adopt patterns as shown in FIGS. 10A and 10B, where one or more cut portions (which are circular or substantially circular in the figure, but may be of any other similar shape, e.g., elliptic or polygonal) at the corners of a rectangular or substantially rectangular shape, or a pattern based on a cross-like shape as shown in FIG. 11A, or a pattern based on a polygonal shape such as a hexagonal shape as shown in FIG. 11B, or a pattern based on a triangular or substantially triangular shape as shown in FIG. 11C.

In the patterns shown in FIGS. 11A and 11B, compared with one having square-rectangular openings as shown in FIG. 5A, the distance from openings to the intersecting parts of wiring portions is shorter, and the light use efficiency in the rhombic openings in the intersecting parts of wiring portions is high. Thus, the patterns shown in FIGS. 11A and B, as they are, are effective with a rectangular or substantially rectangular pattern.

Specifically, in FIG. 5A, the ratio of the distance from the edges of the intersecting parts of wiring portions to their center and the distance from the edges of the singly-extending parts of wiring portions to their center is $\sqrt{2}=1.41$ as will be understood from what has been described. In contrast, the ratio is, in FIG. 11A, about 1.15, and, in FIG. 11B, the ratio is about 1.33.

A shape that makes the above ratio close to one is a shape that permits even use of light. Depending on the required wiring resistance and the margins permitted in the fabrication process, the ratio may be greater or smaller than one as the case may be.

For more even use of light, cut portions 5 as described previously and shown in FIG. 2A, 2B may be added at edges of openings in the intersecting parts of wiring portions so that the ratio is close to one. In FIGS. 11A and 11B, triangular or substantially triangular cuts are the most efficient, but any other pattern may be adopted.

This modified example covers wiring figure patterns such as those involving a pattern having rounded corners, and those involving a curve composed of a plurality of straight lines connected together for reasons related to restrictions in design.

Third Preferred Embodiment

Figure 3B:
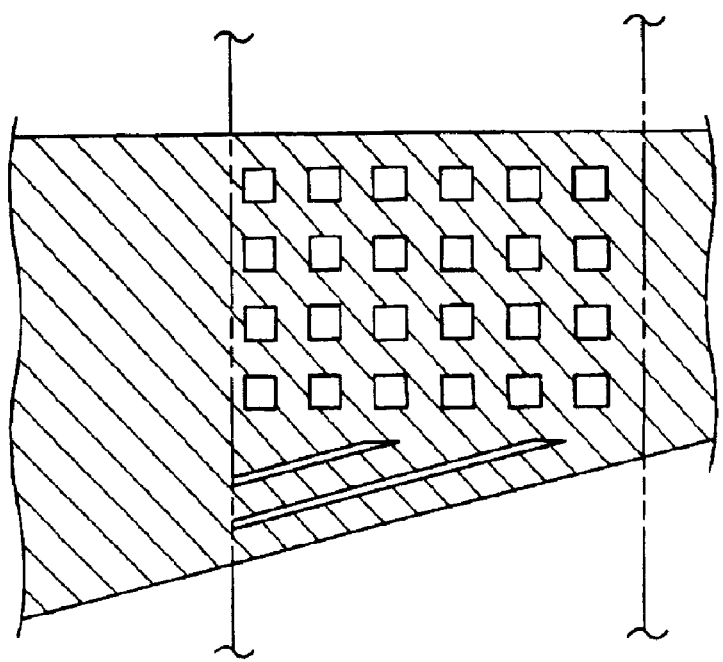
Figure 3A:
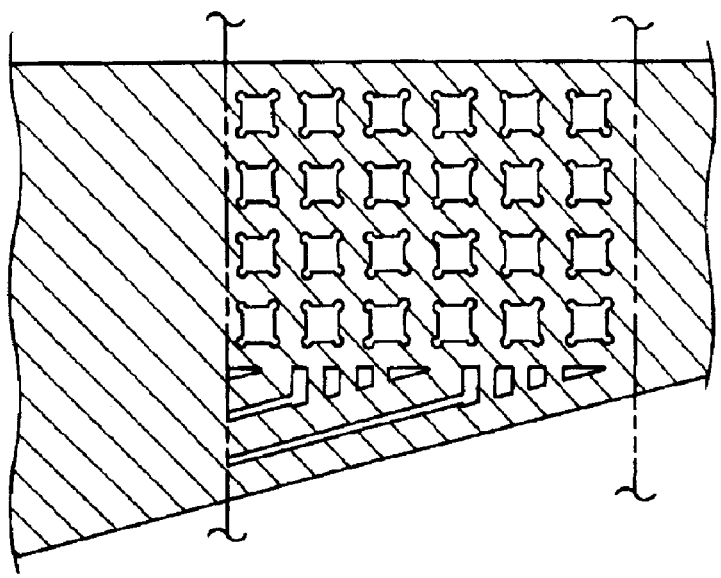
Figure 4:
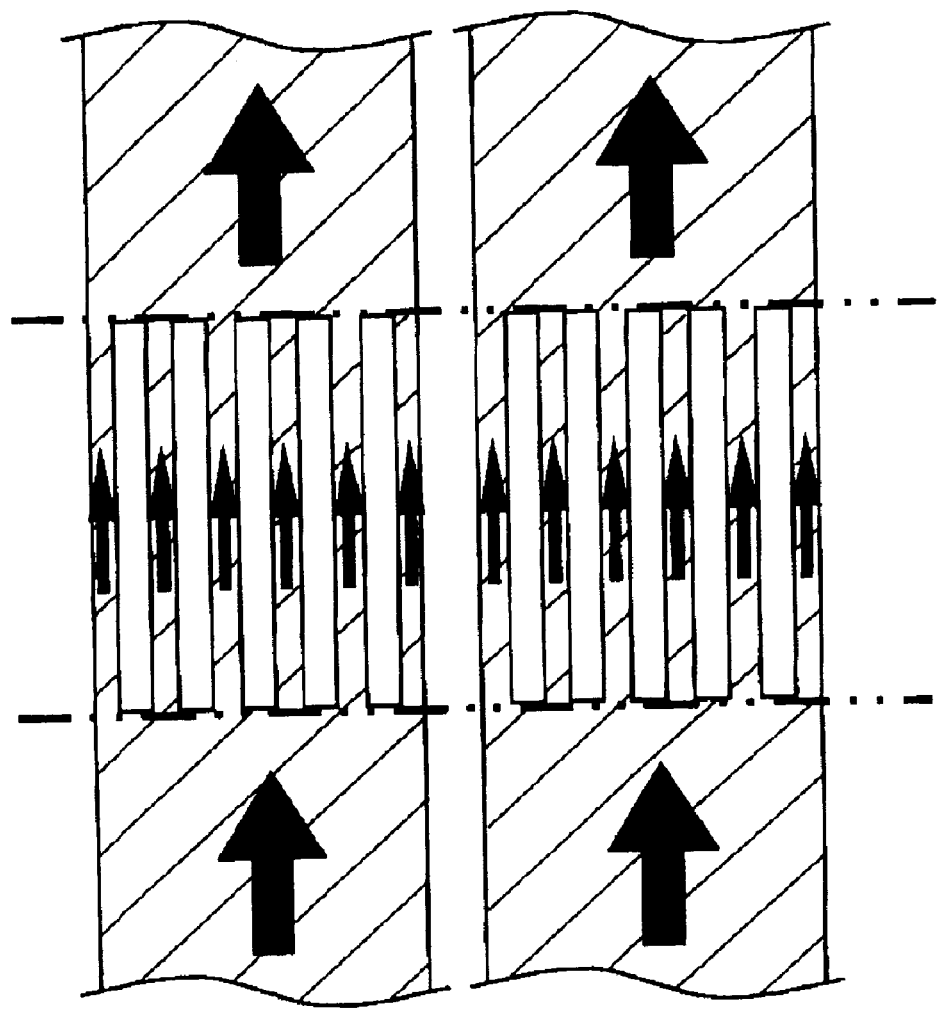
FIG. 4 is a diagram to show a conventional wiring figure pattern having a parallel-wiring structure.

FIG. 3A, 3B show wiring figure patterns of display panel, and FIG. 3B shows a wiring figure pattern according to the third preferred embodiment. In the wiring figure pattern of this preferred embodiment, the parallel-wiring structure of the first preferred embodiment described previously is combined with a mesh-like structure. This preferred embodiment also is meant to be applied to a boardless wiring. In FIG. 3A is shown the appearance before application of the pattern according to this preferred embodiment, and in FIG. 3B is shown the appearance after application of the pattern according to this preferred embodiment.

As shown in the figures, both in FIG. 3A, 3B, a parallel-wiring structure is formed in the left region and a mesh-like structure is formed in the right region, so that the two structures are combined together. In particular, the boundary region between the parallel-wiring and mesh-like structures corresponds to the branch portion in the parallel-wiring structure described in connection with the first preferred embodiment. Thus, in this boundary region, wherever a light passage in the branch portion of the parallel wiring portions extending from lower right to upper left in the figure is not sufficiently open, an opening is additionally formed so that a pattern is obtained that permits irradiation with sufficient light while minimizing electrical resistance. Since a detailed description has already given in connection with the first preferred embodiment, no overlapping description will be repeated here.

Also with respect to the mesh-like structure in the right part of the figure, since a regular rectangular shape as shown in FIG. 3A does not permit the sealing material on the diagonal lines between different parts of wiring portions to be irradiated with sufficient light, cut portions are formed at the four corners of the rectangular or substantially rectangular shape as shown in FIG. 3B so that the sealing material on the diagonal lines is irradiated with light. This also has been described in connection with the second preferred embodiment, and therefore no overlapping detailed description will be repeated here.

The present invention includes not only the third preferred embodiment described above as it is but also any combination of the features of the third preferred embodiment with those of the first and second preferred embodiments.

Although the preferred embodiments described above preferably deal with a boardless wiring as a wiring to which a wiring figure pattern according to the present invention is applied, the present invention is applicable not only to boardless wirings but to ordinary signal wirings in general that are subject to restrictions on their electrical resistance.

The present invention is applicable not only to single layer wirings but also to multilayer wirings, for example, those having a metal film as a gate signal wiring and a metal film as a source signal wirings formed in two layers. In that case, a wiring figure pattern according to preferred embodiments of the present invention is applied to regions where, of those multiple layers, the one having the largest area as seen in a plan view overlaps with a sealing material.

Although the preferred embodiments described above deal with only a liquid crystal display panel as a display panel, the present invention is applicable to any other type of display panel, for example, display panels using organic electroluminescence (EL) as a display medium to which much attention has been paid as next-generation products. In short, the present invention is applicable to any display panel that uses a photo-setting sealing material to bond a color filter substrate and a wiring substrate together and that has slits or openings formed in a wiring on the wiring substrate to permit irradiation of the photo-setting sealing material with light.

The present invention is preferably used in display panels in general, including liquid crystal display panels, in which a color filter substrate and a wiring substrate are bonded together with a photo-setting sealing material in the fabrication process.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wiring figure pattern of a display panel having a display medium held between a pair of transparent substrates on at least one of which the wiring is formed, the wiring figure pattern comprising:

a wiring having openings formed therein so that a photo-setting sealing material is irradiated with light through the openings to permit the pair of transparent substrates to be bonded together with a photo-setting sealing material; wherein the openings include unit figure openings having a substantially rectangular shape and having a cut portion at least at one of four corners thereof which are arrayed both horizontally and vertically at a distance from one another that is substantially equal to a long-side length of the substantially rectangular shape so as to define a mesh-like structure; and the long-side length is substantially equal to an optimal width such that, upon irradiation with light having a predetermined energy, light diffracted around from horizontally and vertically adjoining openings hardens the photo-setting sealing material located on the wiring between the openings, and such that portions of the wiring having the optimal width substantially equal to the long-side length have a predetermined electrical resistance that does not affect driving of and display with liquid crystal.

2. A wiring figure pattern of a display panel having a display medium held between a pair of transparent substrates on at least one of which the wiring is formed, the wiring figure pattern comprising:
a wiring having openings formed therein so that a photo-setting sealing material is irradiated with light through the openings to permit the pair of transparent substrates to be bonded together with a photo-setting sealing material; wherein
the openings are unit figure openings having a substantially rectangular shape and having a cut portion at least at one of four corners thereof which are arrayed both horizontally and vertically at a distance from one another that is substantially equal to a long-side length of the substantially rectangular shape so as to define a mesh-like structure; and
the long-side length is substantially equal to an optimal width such that portions of the wiring having the optimal width that is substantially equal to the long-side length have a predetermined electrical resistance that does not affect driving of and display with liquid crystal.

3. A wiring figure pattern of a display panel having a display medium held between a pair of transparent substrates on at least one of which the wiring is formed, the wiring figure pattern comprising:
a wiring including a plurality of openings having a substantially star-shaped, a substantially cross-shaped, a substantially triangular, or a substantially hexagonal configuration arranged periodically in the wiring so as to permit the pair of transparent substrates to be bonded together with a photo-setting sealing material.

4. A wiring figure pattern of a display panel having a display medium held between a pair of transparent substrates on at least one of which the wiring figure pattern is formed, the wiring figure pattern comprising:
a wiring having a slit formed therein in a region where the wiring overlaps with a photo-setting sealing material so that the photo-setting sealing material is irradiated with light through the slit to permit the pair of transparent substrates to be bonded together with a photo-setting sealing material, the slit arranged so as to divide the wiring into at least one first band extending along a wiring direction and at least one second band including at least one of a branch point and a merge point and extending along the wiring direction, and in order to provide the bands with an optimal width such that, upon irradiation with light having a predetermined energy, light diffracted around from both sides of the bands to top surfaces thereof hardens the photo-setting sealing material located on the top surfaces of the bands, and such that the bands have a predetermined electrical resistance that does not affect driving of and display with liquid crystal, at the branch point and the merge point included in the second band, wherever a band width is larger than the optimal width, the band width is adjusted by varying a width of an end portion of the slit located there; and
the wiring also includes openings formed therein so that a photo-setting sealing material is irradiated with light through the openings to permit the pair of transparent substrates to be bonded together with a photo-setting sealing material, wherein the openings include unit figure openings having a substantially rectangular shape and having a cut portion at least at one of four corners thereof which are arrayed both horizontally and vertically at a distance from one another that is substantially equal to a long-side length of the substantially rectangular shape so as to define a mesh-like structure, and the long-side length is substantially equal to an optimal width such that, upon irradiation with light having a predetermined energy, light diffracted around from horizontally and vertically adjoining openings hardens the photo- setting sealing material located on the wiring between the openings, and such that portions of the wiring having the optimal width substantially equal to the long-side length have a predetermined electrical resistance that does not affect driving of and display with liquid crystal.

5. The wiring figure pattern according to claim 4, wherein the branch point or the merge point has a substantially rectangular shape, a substantially circular shape, or a substantially polygonal shape, or any combination thereof.

6. A wiring figure pattern of a display panel having a display medium held between a pair of transparent substrates on at least one of which the wiring is formed, the wiring figure pattern comprising:
a wiring having a slit formed therein in a region where the wiring overlaps with a photo-setting sealing material so that the photo-setting sealing material is irradiated with light through the slit to permit the pair of transparent substrates to be bonded together with a photo-setting sealing material, the slit being arranged so as to divide the wiring into at least one first band extending along a wiring direction and at least one second band including at least one of a branch point and a merge point and extending along the wiring direction, and in order to provide the bands with an optimal width such that the bands have a predetermined electrical resistance that does not affect driving of and display with liquid crystal, at the branch point and the merge point included in the second band, wherever a band width is larger than the optimal width, the band width is adjusted by varying a width of an end portion of the slit located there; and
the wiring also includes openings formed therein so that a photo-setting sealing material is irradiated with light through the openings to permit the pair of transparent substrates to be bonded together with a photo-setting sealing material, wherein the openings are unit figure openings having a substantially rectangular shape and having a cut portion at least at one of four corners thereof which are arrayed both horizontally and vertically at a distance from one another that is substantially equal to a long-side length of the substantially rectangular shape so as to define a mesh-like structure, and the long-side length is substantially equal to an optimal width such that portions of the wiring having the optimal width that is substantially equal to the long-side length have a predetermined electrical resistance that does not affect driving of and display with liquid crystal.

7. The wiring figure pattern according to claim 6, wherein the branch point or the merge point has a substantially rectangular shape, a substantially circular shape, or a substantially polygonal shape, or any combination thereof.

8. A wiring figure pattern of a display panel having a display medium held between a pair of transparent substrates on at least one of which the wiring is formed, the wiring figure pattern comprising:
a wiring having a slit formed therein in a region where the wiring overlaps with a photo-setting sealing material so that the photo-setting sealing material is irradiated with light through the slit to permit the pair of transparent substrates to be bonded together with a photo-setting sealing material; wherein the slit divides the wiring into at least one first band extending along a wiring direction and at least one second band including at least one of a branch point and a merge point and extending along the wiring direction;

an opening is formed at a width-direction center of the branch point and the merge point; and the wiring includes a plurality of openings having a substantially star-shaped, a substantially cross-shaped, a substantially triangular, or a substantially hexagonal configuration arranged periodically in the wiring so as to permit the pair of transparent substrates to be bonded together with the photo-setting sealing material.

9. The wiring figure pattern according to claim 8, wherein the branch point or the merge point has a substantially rectangular shape, a substantially circular shape, or a substantially polygonal shape, or any combination thereof.

* * * * *